United States Patent [19]

Henrichon, Jr.

[11] 4,292,622
[45] Sep. 29, 1981

[54] SYSTEM AND METHOD FOR PROCESSING HORIZONTAL LINE CHARACTERISTICS IN AN IMAGE

[75] Inventor: Ernest G. Henrichon, Jr., Bedford, N.H.

[73] Assignee: Hendrix Electronics, Inc., Manchester, N.H.

[21] Appl. No.: 123,485

[22] Filed: Feb. 21, 1980

[51] Int. Cl.$^3$ .............................................. G06K 9/34
[52] U.S. Cl. ................ 340/146.3 SG; 340/146.3 AC; 340/146.3 MA
[58] Field of Search ............... 340/146.3 ED, 146.3 J, 340/146.3 AC, 146.3 H, 146.3 MA, 146.3 AE, 146.3 SG

[56] References Cited

U.S. PATENT DOCUMENTS

| | | | |
|---|---|---|---|
| 3,201,752 | 8/1965 | Rabinow | 340/146.3 H |
| 3,264,610 | 8/1966 | Rabinow | 340/146.3 ED |
| 3,786,416 | 1/1974 | Bhimani | 340/146.3 AC |
| 4,158,835 | 6/1979 | Miura et al. | 340/146.3 H |

OTHER PUBLICATIONS

Kuckein, "Index-Mark Detector", IBM Tech. Disclosure Bulletin, vol. 15, No. 3, Aug. 1972. pp. 747-748.

Kerchmar, "Fraction Detection Logic", IBM Tech. Disc. Bulletin, vol. 15, No. 5, Oct. 1972, p. 1488.

Primary Examiner—Leo H. Boudreau
Attorney, Agent, or Firm—Kenway & Jenney

[57] ABSTRACT

A system for processing digitized scan data representative of an image including at least one line of symbols. The system processes the scan data to identify bits including at least one line of symbols representative of horizontal line segments in the image which have a minimum predetermined length in the horizontal direction. Underline tag signals are generated which are representative of those identified horizontal line segments which lie below text characters in the line of symbols being processed. The system further processes the scan data to filter, or remove, all of the bits representative of horizontal line segments to provide a character data signal, where the character data signal is representative of the line of symbols with the predetermined length horizontal lines stripped away. The system then processes the character signals to identify the various text characters, and to generate character signals representative of those identified characters. The system then associates the underline tag signals with the corresponding character signals.

56 Claims, 6 Drawing Figures

SYSTEM AND METHOD FOR PROCESSING HORIZONTAL LINE CHARACTERISTICS IN AN IMAGE

BACKGROUND OF THE INVENTION

The present invention is in the field of data processing, and more particularly, relates to optical character recognition.

Optical character recognition (OCR) systems have been developed to permit entry of textual material on a printed page into a data processing system. Such systems typically require the input text to be composed of symbols having a specially designed type font, where the various symbols-to-be-recognized are positioned on a page in accordance with a well-defined set of rules. The symbols-to-be-entered are defined by regions on the page having an optical characteristic in a first range against a background having an optical characteristic in a second range. For example, the optical characteristic may be reflectivity, and a symbol defined by "black" regions against a "white" background.

For a typical OCR system, a page of text-to-be-entered is initially fed into an optical scanning device where contiguous elemental areas (i.e. picture elements, or pixels) in the text are successively scanned in a raster pattern. A video scan data signal is generated which is representative of the reflectivity of the succession of scanned pixels. The OCR system then processes this digital scan data signal to identify, or recognize, the various characters. This recognition processing generally requires a first step of image segmentation, or identification of a data field containing a character from the line of symbols. Conventionally, the OCR systems rely on "white" space between the characters (horizontally) and lines of symbols (vertically) for effecting character isolation prior to recognition. Then the isolated characteristic is selectively processed to detect various shape features. A number of optical character feature extraction and recognition techniques are known in the art, such as that disclosed in U.S. Pat. No. 3,930,231. An exemplary system which performs optical character recognition is the Model "Typereader 2", manufactured by Hendrix Electronics, Inc., Manchester, N.H.

Generally, the prior art OCR systems do not permit the use of underline characters together with a text character, i.e. a text character having a horizontal line positioned beneath the text character. One reason for this limitation is that the normal mode of inputting textual material for the OCR system is by typewriter, and in view of the nominal tolerances of the typewriters, variations in the relative positions of the characters in the input text permit touching of an underline character with a text character. Such touching may occur between a text character and its associated underline character, or between a text character and the underline character associated with a text character in the preceding line of symbols in the text. The composite symbol resulting from the touching text character and underline character is generally not recognizable to the OCR system.

The prior art OCR systems that do process input textual material having underline characters, require a sufficient "white" space between lines of symbols so that scan data representative of regions of the horizontal "black" (of an underline character) bounded by "white" from below can be detected and stripped prior to (or ignored during) the character recognition process. While such systems are effective provided that no touching occurs, the utility of OCR systems, with underline capability, are severely limited in practice because of the tolerance limitations of the input typewriters. Furthermore, the prior art OCR systems providing underline detection require relatively large storage capability to accommodate the data representative of the text, which may be processed off-line.

Accordingly, it is an object of the present invention to provide a system and method for processing data representative of an image containing at least one line of symbols which may include underline characters.

It is another object to provide an underline processor and method which detects underline characters which may touch associated text characters from above and below.

A further object is to provide a "real time" system and method for identifying underline characters in a line of symbols.

Yet another object is to provide a system and method for detection of underline characters in textual material where the underline characters may vary substantially in thickness and vertical registration, or skew.

Another object is to provide a system and method for detection of horizontal line segments having a minimum predetermined length in textual material.

SUMMARY OF THE INVENTION

Briefly, the present invention provides a method and system for processing a succession of bits of digitized scan data, where the bits are representative of an optical characteristic of a corresponding succession of elemental areas (or pixels) of a vertically scanned image. The image may include at least one substantially horizontal line of symbols against a background. Each symbol is defined by pixels having the optical characteristic in a first range and the background is defined by the pixels having the optical characteristic in a second range. For example, the optical characteristic may be reflectivity, with the symbols being defined by "black" pixels and the background being defined by "white" pixels.

Each of the symbols may be representative of a text character, or an underline character, or a text character and its associated horizontal underline character immediately below that text character. In the scan data, the various bits may have a first binary value (e.g. binary "1") when corresponding to symbol ("black") pixels, and a second binary value (e.g. binary "0") when corresponding to background ("white") pixels.

Initially, the scan data is processed to identify bits representative of horizontal line segments in the image which have a minimum predetermined length in the horizontal direction. The identified bits are further processed to identify those horizontal line segments which lie below text characters in the line of symbols being processed. Underline tag signals are generated which are representative of those identified horizontal line segments. The scan data is processed to filter, or remove, all of the bits representative of horizontal line segments to provide a character data signal. In the succession of bits in the character data signal, the bits corresponding to the scan data bits which are identified as horizontal line segments, have the second binary value (e.g. binary "0"), while the other character bits have the same binary value as the corresponding bits in the scan data signal. Thus, the character data is representative of the line of symbols with the predetermined length horizontal lines stripped away. Further processing is then performed to identify, or recognize, the various text characters, and to generate character signals representative of those identified characters. Finally, the underline tag signals previously generated are then associated with the corresponding character signals.

In one form of the invention, the horizontal line segments are identified by processing the various bits of the scan data which are representative of a succession of vertical swaths of the line of symbols, where each swath is one pixel wide in the horizontal direction and extends a number of pixels above and below the line of symbols. For each current swath, a mask word is generated. Each mask word includes a bit corresponding to each pixel in the current swath. The respective bits (for corresponding pixels) in the mask word have a first binary value (i.e., binary "1") when any of the following conditions is present:

1. The corresponding pixel in the current swath is black, and the corresponding pixels in at least a predetermined number (X-1) of contiguously succeeding swaths are also black,
2. The corresponding pixel in the current swath is black and the corresponding pixels in at least a predetermined number (Y-1) of contiguously succeeding swaths are black, and the corresponding pixel is adjacent to a pixel in the current swath for which the corresponding mask word bit is binary 1, and
3. The corresponding pixel in the current swath is black and the corresponding mask word bit for the next previous swath is binary 1. Otherwise, the respective bits in the mask word have the second binary value (i.e., binary "0").

In this form of the invention, the binary "1" bits of the mask word are representative of the pixels in the stored data which represent horizontal lines. These identified horizontal lines are stripped away from the scan data to form the character data.

In an alternative form of the invention, the mask word may be the logic OR of a primary mask word, as defined above, and an auxiliary mask word. For example, in addition to the various bits of the primary mask word defined to be binary 1 or binary 0 as described above, auxiliary mask word bits may also be defined as binary 1 when the corresponding pixel is black and is adjacent to and below a pixel in the current swath for which the corresponding mask bit is 1, and the corresponding pixel is adjacent to and above a pixel in the current swath which is white.

In other embodiments, yet another auxiliary mask word condition ("2Z+1 white qualification-top") may provide a binary 1 bit in the mask word for a corresponding pixel. This condition occurs when the corresponding pixel is black and that pixel is adjacent to and above a pixel in the current swath for which the corresponding mask word bit is 1, and the corresponding pixel is adjacent to and below a predetermined number (2Z+1) of contiguous white pixels which extend horizontally and are centered about the current swath.

In yet another similar embodiment, another auxiliary mask word condition (2Z+1 white qualification-bottom) may provide a binary 1 bit for the mask word for a corresponding pixel. This condition occurs when a pixel is black and is adjacent to and below a pixel in the current swath for which the corresponding mask word bit is 1, and the corresponding pixel is adjacent to and above a predetermined number (2Z+1) of contiguous white pixels extending horizontally and centered about the current swath.

In such embodiments, an auxiliary mask word bit may also be set to binary 1 for a current pixel when that pixel is black and is adjacent to and above (or below) a pixel in the current swath for which the corresponding mask word bit is 1, and the current pixel is adjacent to and below (or above) a number (less than Z+1) of contiguous white pixels extending horizontally (in both directions) from said current swath, wherein at least one of those contiguous pixels on each side of the current swath is adjacent to and above (or below) a white pixel. These latter auxiliary mask word bits provide a "truncated 2Z+1 white qualification" which provides improved horizontal line filtering, particularly for edge perturbations which do not touch but are close to a text character. In other embodiments the truncated qualification test may be applied in only one direction (either to the right or to the left of the current swath) in conjunction with the 2Z+1 qualification (i.e. Z contiguous white pixels) applied to the other side of the current swath.

The above embodiments may also be modified to filter (or strip) scan data bits representative of ragged edges (for example, more than one pixel in the vertical direction) of horizontal lines. In such modified forms of the invention, the main portions of the horizontal lines are identified for a current swath in the manner described above. For each binary 1 bit in the mask word, the pixels corresponding to the immediately adjacent mask word bits are examined to determine whether those pixels meet the filtering conditions. If so, then the bits corresponding to those pixels are identified as horizontal line segments. If not, then the next adjacent pixels in the swath are similarly examined. This process is repeated for a predetermined number of cycles. All bits so examined are identified as horizontal line segments.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
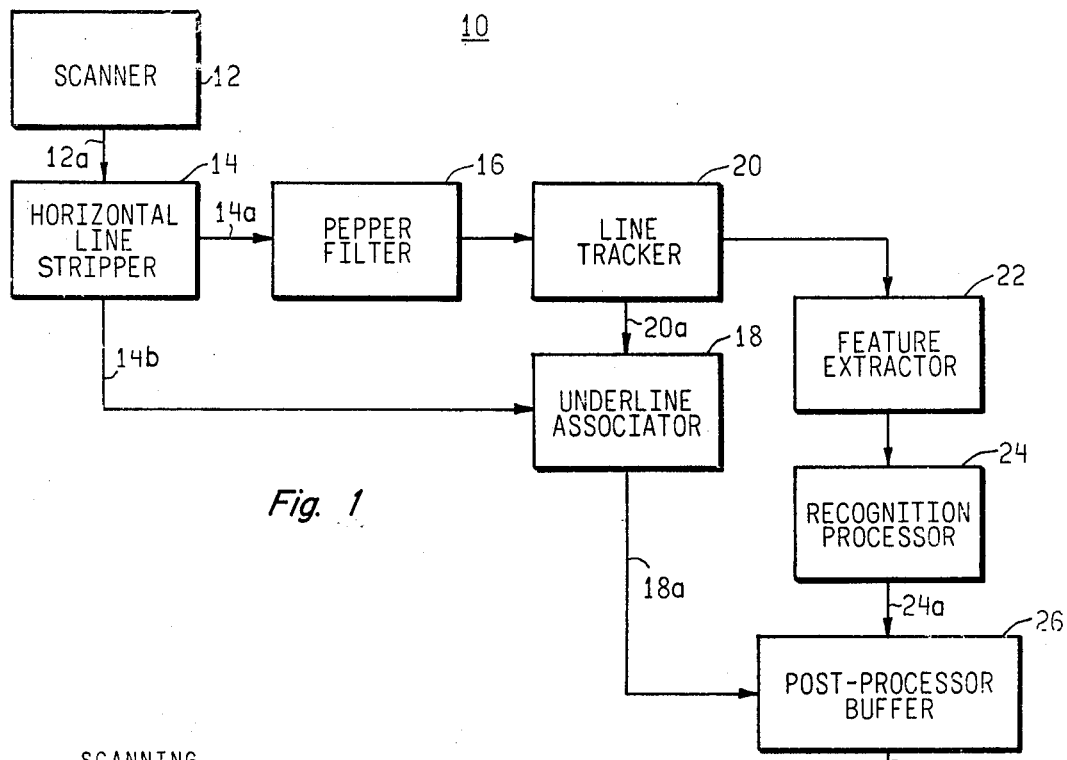
FIG. 1 shows in block diagram form, an exemplary system embodying the present invention.
Figure 2A:
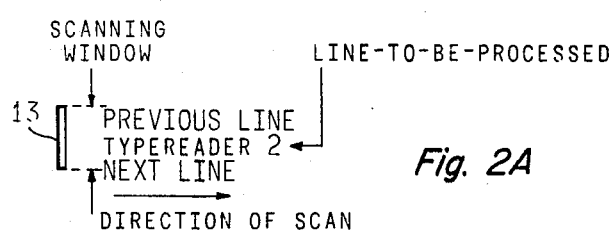
FIG. 2A illustrates the scanner sensor of the embodiment of FIG. 1 together with an example of text-to-be-scanned.
Figure 2B:
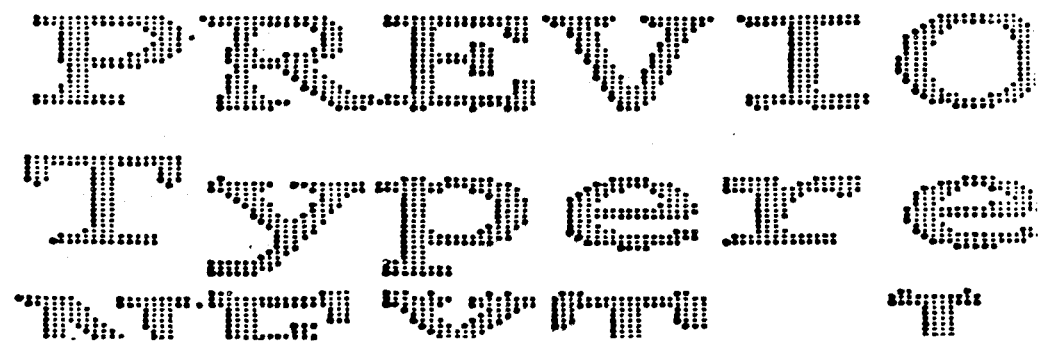
FIG. 2B illustrates in digitized format, a portion of the text-to-be-scanned of FIG. 2.

FIG. 1 shows in block diagram form, an embodiment of the present invention. The system 10 of FIG. 1 includes a scanner 12, horizontal line stripper (HLS) network 14, pepper filter 16, underline associator network 18, line tracker network 20, feature extractor 22, recognition processor 24 and post processor 26. The scanner 12 is a conventional type scanner for providing a continuous stream of digitized video scan data from a linear photodiode array. The scan data is representative of a bottom-to-top vertical raster scan of a line of symbols against a background. FIG. 2A shows an exemplary linear photodiode array 13 (64×1 cell), in conjunction with three lines of symbols in an image-to-be-scanned. FIG. 2B shows an exemplary digitized array output resulting from scanning a portion of the lines of symbols shown in FIG. 2A.

The digitized video signal from scanner 12 is applied by way of line 12a to the horizontal line stripper 14. HLS 14 detects all horizontal lines of a predetermined length in the line being scanned and provides a character (or masked) data signal on line 14a to a pepper filter 16. The pepper filter 16 is a conventional filter which "cleans up" isolated spots and ragged edges of the characters which may have resulted from the processing in the HLS 14.

The character data signal on line 14a is related to the video scan data signal on line 12a, in that the bits determined to be portions of horizontal lines are represented by background or "white" bits, while all other bits are the same as the corresponding bits in the scan data signal. HLS 14 also provides a horizontal line profile (or mask) signal on line 14b, which is applied to the underline associator 18. The pepper filter 16 is coupled to the line tracker 20, which in turn provides a current full height (last character profile or LCP) signal on line 20a to the underline associator 18. The line tracker 20 extracts the current line of text-to-be-processed from the field of view under the scanning window established by the diode array. For example, in the scanning window scanned by the diode array 13 depicted in FIG. 2A, the current line of text-to-be-processed includes the symbols "Typereader 2". Since the horizontal line stripper in effect strips all horizontal lines from the video scan data, the underline associator 18 is operative in conjunction with the last character profile signal from line tracker 20 and the horizontal line profile signal from HLS 14 to generate underline tags only for characters in the line-to-be-processed. Thus, the underline associator 18 determines whether or not a stripped pattern or character was derived from the symbol line-being-tracked. If so, the corresponding underline tag signal is applied by way of line 18a to the post-processor buffer 26 for re-association with the character. Line tracker 20 also provides the character data as modified by the pepper filter 16 to a feature extractor 22 and recognition processor 24 in sequence.

The feature extractor 22 and recognition processor 24 may operate in a conventional manner to first extract shape features from the character data and then to process those features to identify the various characters based on a "table look-up" of features, for example, in the manner described in U.S. Pat. No. 3,930,231. The recognition processor 24 provides outputs on line 24a in the form of ASCII codes which are representative of the characters extracted from the character data signal.

The underline tags from line 18a and the ASCII code signal from line 24a are applied to the post-processor buffer 26 which adds an underline tag to the character codes from line 24a which have associated underines. The resultant tagged ASCII data words are provided on the data out line 26a.

While underline characters do not always start and stop with the physical text character image boundaries (e.g., " "), the buffer 26 may in various embodiments perform further processing to assure that all underline characters satisfy conventional grammer rules (e.g. underline words or phrases are preceded and followed by non-underline space bands).

Figure 3:
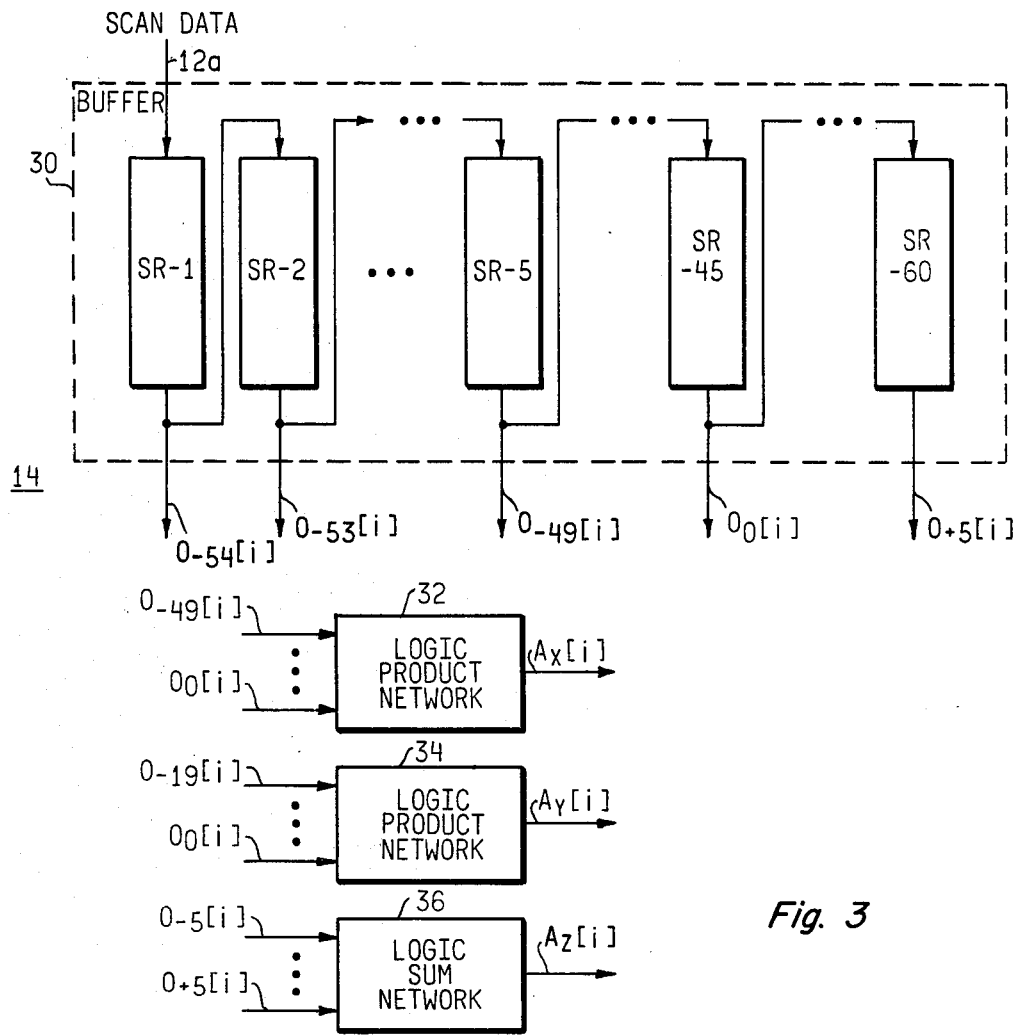
FIG. 3 shows in block diagram form, the horizontal line stripper of FIG. 1.

An exemplary form of the horizontal line stripper 14 is shown in block diagram form in FIG. 3. HLS 14 includes a video buffer 30, logic product network 32, logic product network 34, logic sum network 36, horizontal mask generator 38 and character data generator 40. Buffer 30 has the form of sixty series-connected, 64-bit shift register elements, SR-1 through SR-60. These shift register elements are configured so that the input scan data from line 12a is serially clocked into the first shift register (SR-1) and then to SR-2, and so on down to SR-60. The output of each of the shift registers is shown as $O_{-54}(i)$, $O_{-53}(i)$, ..., $O_{-49}(i)$ ..., $O_0(i)$, ..., $O_{+5}(i)$. With this configuration, for symbols in a line being raster scanned at a rate of 50 vertical swaths per symbol, scan data representative of an entire symbol may be stored in the shift register array of buffer 30, together with a five swath guard band on each side.

If effect, as the scan data is clocked through the buffer 30, the output lines $O_j(i)$ (where j is the swath number in the range $-54$ to $+5$) sequentially provide data representative of a succession of horizontal slices of the symbol and surrounding background. The index i of the output lines denotes the $i^{th}$ bit (or row) from the bottom of the 64 bit profile (or vector) for each of the 60 swaths. In effect, the output lines $O_j(i)$ provide a horizontal patch which slides from the bottom to the top of the symbol.

The logic product network 32 is coupled to the output lines $O_{-49}(i)$ through $O_0(i)$ and provides an output signal $A_X(i)$ for the $i^{th}$ row. The network 32 provides a logic product, i.e. the output $A_X(i)$ is 1 for the $i^{th}$ row, provided all of the bits in swaths $-19$ through $0$ are 1's, as specified in the Boolean formula:

$$A_X(i) = \prod_{j=-49}^{0} O_j(i) \tag{1}$$

where the index j represents the number of the swath, and the symbol $\pi$ represents the logic AND function.

The logic product network 34 similarly is coupled to the output lines $O_{-19}(i)$ through $O_0(i)$ (i.e. the $-19^{th}$ through $0^{th}$ swaths) and provides an output signal $A_Y(i)$ in accordance with the Boolean formula:

$$A_Y(i) = \prod_{j=-19}^{0} O_j(i) \tag{2}$$

The logic sum network 36 is similarly connected to the output lines $O_{-5}(i)$ through $O_{+5}(i)$ and produces an output signal $A_Z(i)$ representative of the logical sum of the coupled inputs, in accordance with the Boolean formula:

$$A_Z(i) = \sum_{j=-5}^{+5} O_j(i) \tag{3}$$

where the symbol $\Sigma$ is representative of the logic OR function.

The horizontal mask generator 38 is responsive to the signals $A_X(i)$, $A_Y(i)$, and $O_0(i)$ to generate a primary mask signal $M(i)$ on line 14b, in accordance with the Boolean formula:

$$M(i) = A_X(i) + A_Y(i) \cdot [M_{-1}(i-1) + M_{-1}(i+1)] + O_0(i) M_{-1}(i) \tag{4}$$

where the subscript −1 for M indicates the value for M in the immediately preceding or "just filtered" swath (i.e. for the swath associated with output line $O_{+1}(i)$ of buffer 30) and the parentheticals i−1 and i+1 associated with $M_{-1}$ are representative of the rows below and above, respectively, the $i^{th}$ row. Generator 38 is also responsive to $O_0$, $A_Z$ and the primary mask signal to provide an auxiliary mask signal $M_A(i)$ on line 14bb, in accordance with the Boolean formula:

$$M_A(i) = M(i+1) \cdot \overline{O_0(i-1)} + M(i-1) \cdot \overline{A_Z(i+1)} \quad (5)$$

The signals from lines 14b and 14bb, as well as $O_0(i)$ are combined by character (masked) data generator 40 to produce the mask data signal MD(i) on line 14a, in accordance with the Boolean formula:

$$MD(i) = O_0(i) \cdot \overline{M(i)} \cdot \overline{M_A(i)} \quad (6)$$

In this configuration, the primary mask only is dependent on pixels identified by $A_X$ and $A_Y$. However, in alternate embodiments that mask may also be dependent on $A_Z$ by ORing equation (4) with the term $O_0(i) \cdot M_{A-1}(i)$.

With the present configuration, the $i^{th}$ bit of the binary current swath mask word M(i) is set to be a binary 1 when the corresponding pixel in the current swath is black and the corresponding pixels in at least the 49 succeeding swaths have also been black, or when the corresponding pixel in the current swath is black and the corresponding pixels in at least 19 of the immediately succeeding swaths are also black and the pixel in the current swath is adjacent to a black pixel in the next previous swath, or the corresponding pixel in the current swath is black and the corresponding bit in the mask word for the next previous swath, $M_{-1}(i)$ is 1. Otherwise, the bits in the mask word are zero.

In the present embodiment, a one bit in the auxiliary mask signal $M_A(i)$ is provided for a black pixel in the current swath which is adjacent to and below a pixel in that current swath for which the mask bit is 1, and the pixel in the current swath is adjacent to and above a white pixel in the current swath. Thus, a bit one position below a mask region is filtered, if, in addition, the bit directly below it is white.

Yet another one is set in the auxiliary mask word for a black pixel in the current swath which is adjacent to and above a pixel in the current swath which has a corresponding one bit in the mask word, and which is adjacent to and below a predetermined number (2Z+1) of contiguous white pixels which extend in the horizontal direction, and which are centered about the current swath. Thus, a pixel above a masked region is filtered if the next pixel above a masked region is white and its horizontal neighbors (plus and minus Z swaths) are also white. This filtering condition is referred to as "2Z+1 white qualification-top".

Figure 4:
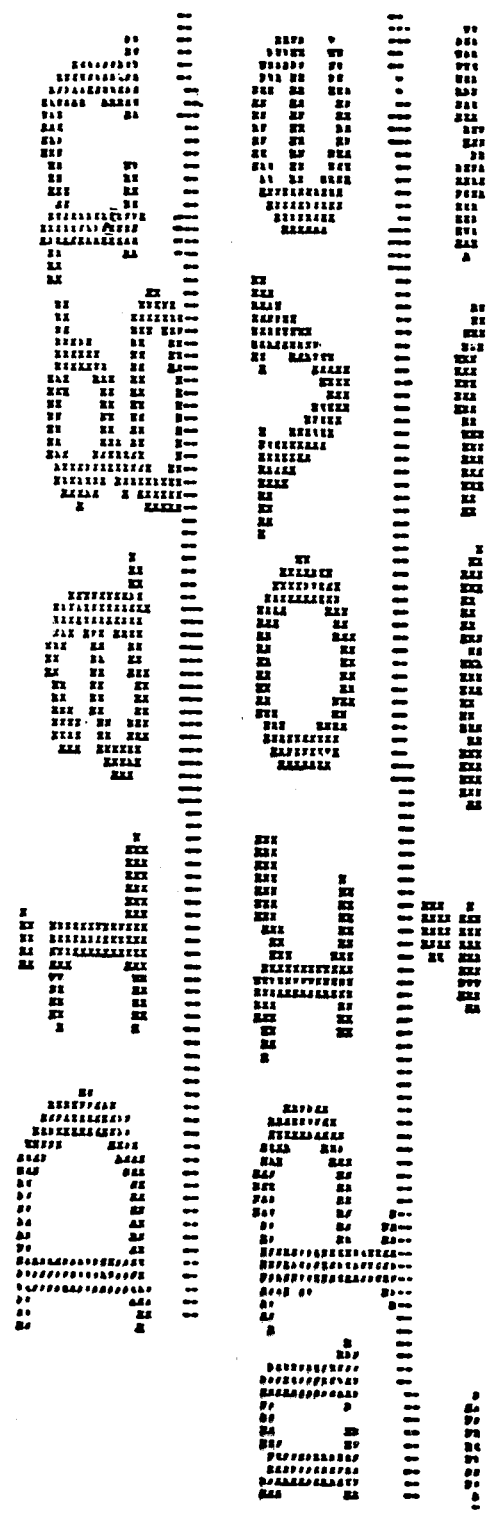
FIG. 4 illustrates in digitized format, exemplary text processed by the horizontal line stripper of FIG. 3.

FIG. 4 illustrates the above-described filtering process where the horizontal line bits which are filtered from the video scan data are shown as "|", and the remaining black bits are denoted by "X". In this illustration, the serifs on the "p" and the loop of the "g" are both continued as character points rather than as horizontal line segments. In effect, the character data signal on line 14a has binary 1's corresponding to all of the X's in FIG. 4, and binary zeros otherwise. Similarly, the combined (i.e. primary and auxiliary) mask signal provided on lines 14b, 14bb has binary 1's corresponding to all of the "|"'s in FIG. 4, and binary 0's otherwise.

With this configuration, a continuous horizontal line profile is provided by the combined mask data M(i) and $M_A(i)$ on lines 14b and 14bb, and a continuous stream of character data is provided by mask data MD(i) on line 14a. While in the present embodiment, the indexing values for equations (1), (2) and (3) are respectively 50 swaths, 20 swaths and 10 swaths, alternate values may be used in different embodiments to accommodate other type fonts and pitch. It will be understood that the present embodiment is adapted for 10 pitch Prestige Pica, where the character pitch bands are assumed to be 20 swaths. Table 1 denotes exemplary values for parameters X, Y and Z for use with various typestyles.

TABLE 1

| Typestyle | Pitch | #Swaths for initial mask entry X | #Swaths for adjacent row update Y | #Swaths (+ and −) fot top qualification Z |
|---|---|---|---|---|
| OCR-B | 10 | 20 | 20 | 5 |
| OCR-B | 12 | 17 | 17 | 5 |
| Letter Gothic | 12 | 17 | 17 | 5 |
| Courier 12 | 12 | 42 | 17 | 5 |
| Prestige Elite | 12 | 42 | 17 | 5 |
| Courier 72 | 10 | 50 | 20 | 5 |
| Prestige Pica | 10 | 50 | 20 | 5 |

Following the underline filtering, the system 10 of FIG. 1 determines whether any of the detected horizontal lines fall within a range referenced to the base line of the line being tracked. The line tracker 20 identifies the line of symbols being tracked and provides a last character profile (LCP) signal on line 20a which in effect provides a vertical reference to the bottom of the previous full height character profile (LCP). If a filtered line profile falls within a predetermined window below the LCP, the underline associator 18 detects an associated horizontal line profile, i.e. the mask, and generates an underline tag on line 18a so that each swath that contained portion of the underline pattern is tagged. Subsequently, these tags are identified in the post-processor buffer 26 which reassociates the character codes (in ASCII), which are produced by recognition processor 24, with the underline characteristic for the respective characters.

In summary, for a current swath being processed, a mask is formed by generating binary 1's at all bit positions corresponding to pixels in the swath which:
  (A) are presently black and are continuously black at least X-1 swaths in the future (for left-to-right processing as in FIG. 2, future corresponds to swaths to the right), or
  (B) are presently black and which are continuously black for at least Y-1 swaths in the future and are adjacent to existing black mask bits, or
  (C) are presently black and have corresponding black bits in the current swath which match existing mask bits in the mask word corresponding to the next previous swath. In a previously set mask, bits which do not have corresponding black entries in the current swath, are re-set to zero. The system 10 filters from the scan data stream any black bits in the current swath which:
  (A) match a corresponding set bit in the mask, or
  (B) match a corresponding set bit in the mask for the row directly above it, provided that the bit in the row of the current swath directly below it and adjacent to is white, (C) match a corresponding set bit in the mask for the row directly below it, provided that the bit in the row of the current swath is directly above (adjacent to) it is white and its neighbors in this adjacent row are continuously white for $+Z$ and $-Z$ successive swaths. Similar qualification conditions may be performed for the bottom of a line, as disclosed above.

Variations of the basic horizontal line filtering embodiment described above may utilize "OR-ing" rows together with the buffer 30 for detecting horizontal line condition, or permitting ragged edges of greater than $+1$ and $-1$ in the vertical dimension to be stripped, in addition, (that is, $+2$ and $-2$ rows away from the black (i.e. binary 1) mask bit. For example, in the present embodiment, the "$2Z+1$ white qualification" condition (which may be applied either to the top or bottom of a line being processed) is detected with respect to a black pixel which is adjacent to (i.e. displaced by a single pixel position) a reference pixel in the current swath having a corresponding binary 1 mask word bit. In alternative embodiments, this condition may be detected for a pixel displaced by n pixel positions from the reference pixel, where all the intermediate pixels are also identified as being part of the horizontal line. In such embodiments, the test for this condition may be performed iteratively (i.e. for increasing integer values of n) for pixels extending from the reference pixel, either until the condition is met, or for a predetermined number of iterations.

Further, the "$2Z+1$ white qualification" tests may be truncated, as described above. In still other alternative embodiments, a separate swath buffer may contain only the filtered horizontal line profiles for subsequent matching against character base-line information.

Figure 5:
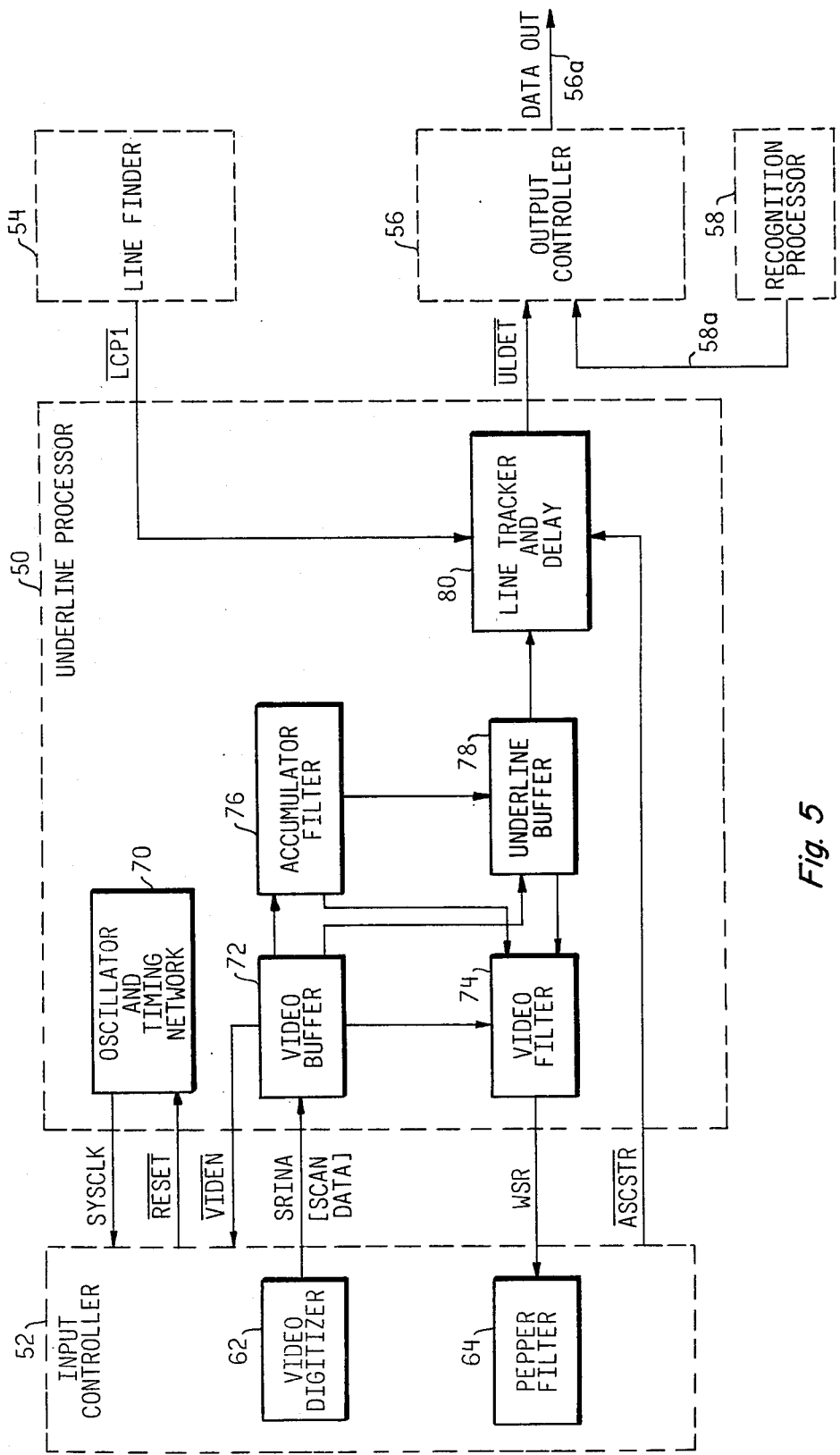
FIG. 5 shows in block diagram form, an alternative embodiment of the present invention.

FIG. 5 shows an embodiment of the present invention adapted for use with a model "Typereader 2" System, manufactured by Hendrix Electronics, Inc., Manchester, New Hampshire. In this embodiment, an underline processor 50 is adapted to interfere directly with input controller network 52 (including the video digitizer 62 and pepper filter 64), line finder network 54, output controller network 56 and recognition processor network 58 of the Typereader system. The networks 52, 54, 56 and 58 are standard modules in the Typereader 2 system. In this embodiment, networks 52, 54 and 56 are modified to provide paths for the various signals set forth in Table 2.

TABLE 2

| NAME | FUNCTION |
|---|---|
| INPUT | |
| $\overline{\text{LCP1}}$ | Last Character Profile |
| SRINA | Digitized Video |
| $\overline{\text{ASCSTR}}$ | ASCII Strobe |
| $\overline{\text{RESET}}$ | Timing Signal |
| OUTPUT | |
| WSR | Filtered Video |
| $\overline{\text{VIDEN}}$ | Enabled Underline Video Input |
| SYSCLK | System Clock |
| $\overline{\text{ULDET}}$ | Underline Detect |

The underline processor module 50 includes an oscillator and timing network 70, video buffer 72, video filter 74, accumulator buffer 76, underline buffer 78 and line tracker and delay network 80.

Generally, the underline processor 50 detects and filters horizontal lines related to the video prior to processing by the remaining OCR networks in the Typereader system. The underline processor 50 determines whether detected underlines are associated with a line of symbols currently being processed and if so, flags the underline character or space when the recognition logic (of network 58) presents that character or space code to the output controller (in network 56). In operation, network 52 outputs digitized video scan data (SRINA) to the processor 50, which in turn detects and filters all underline related video. The filtered video (WSR) is then returned to network 52 at the input to the pepper filter 64. Processor 50 flags the underline characters and spaces with the flag signal ULDET from line tracker and delay network 80 as those characters and spaces are read into the output controller network 56 from network 58. The output controller 56 then transmits the underline character information under stored format control (in this case, ASCII code), followed by a backspace (HEX 08) and underscore (HEX 5F) on the data out line 56a. Generally, the Typereader system includes modifications which disable the oscillator in network 52, and which provide an output last character profile ($\overline{\text{LCP 1}}$) signal to network 50 from network 54, horizontal synchronizing signals from network 52 to network 50, and corresponding backplane point-to-point modification.

In operation, the digitized video scan data (SRINA) is temporarily stored in a 64 swath video buffer 72. A predetermined pattern of related bits are read out from buffer 72 each bit time, with this data being used to update three accumulators per bit position in accumulator buffer 76. The accumulators are maintained in RAM to monitor bit sequences across a given bit position. The accumulator values are used to generate a mask indicating all bit positions which currently contain a valid underline in the manner described above in conjunction with FIG. 3. In the underline buffer 78 the mask signal from buffer 76 is applied to the line tracker and delay network 80. In response to the last character profile signal ($\overline{\text{LCP 1}}$) from network 54, network 80 determines if a detected underline bit in the mask signal is associated with the line currently being processed by the recognition logic in network 58. If so, network 80 generates an underline flag signal ($\overline{\text{ULDET}}$) which is delayed appropriately to be synchronous with the character code produced by network 58 on line 58a. The output controller 56 then formats the data out on line 56a when an underline flag is received so that the character code is followed by a backspace and underscore signal. In addition, the accumulator buffer 76 and underline buffer 78 control the video filter 74 to extract the underline character bits from the scan data signal to generate a video signal (WSR) which is stripped of horizontal line segments. This WSR signal is applied to the pepper filter 64 in network 52.

In network 70, a 22.3733 MHZ oscillator drives a divide-by-5 Johnson Counter to generate the timing signals. One phase of the counter (SYSCLK) is applied to the backplane as the system clock. Another phase clocks a Memory Access Counter (MAC) in network 70. Each bit time (1.78 usec is divided into eight equal memory access periods of 223.5 nsec) the Memory Access Counter is reset (by $\overline{\text{RESET}}$) to 0 every swath period to ensure synchronization between network 52 and 50. The MAC's outputs are decoded to provide timing pulses, which in turn are gated with a phase of the Johnson Counter.

The video buffer 72 includes a 4K RAM, organized as 4096×1, with a maximum access time of 150 nsec. Functionally, the RAM is organized as 64 swaths of 64 bits each. Appropriate bit addresses are generated each memory access period by adding MAC controller offsets to the bit address latch contents. The bit address latch is reset to 0 prior to each swath by the RESET signal. Swath addresses are a function of swath address latch contents and a 6 bit offset value microcoded in two 32×8 PROM's. The offset value allows access to the same bit position within other swaths, either behind or ahead of the current swath. The offset is a function of memory access timing, pitch, and the font selected.

The accumulator buffer 76 includes two 256×4 RAM's, organized as 256×8, with a maximum access time of 80 nsec. Functionally, buffer 76 provides 3 six bit accumulators for each of the 64 bit positions. Bit 7 of each accumulator is reserved for the underline mask and bit 8 is used as a one swath delay for the masked data output. During each bit time the accumulators are updated from the video buffer 72. The accumulator values are compared against a 6-bit field of microcode which is a function of memory access timing, pitch, and font selected. The results from the comparisons are used for generating the underline mask and masked data.

The generation of a mask bit is equivalent to the detection of an underline. The detected underline is delayed, and then logically compared with the LCP signal. An output flag indicates that the detected underline is associated with the line currently being processed by the OCR portion of the system 48. Once this is determined, then an underline detect signal ($\overline{ULDET}$) is transferred to the output controller 56 synchronously with an ASCII strobe ($\overline{ASCSTR}$).

Video scan data is filtered as a function of the underline mask provided by underline buffer 78, accumulator values and adjacent bits. The masked data is delayed one swath time to allow it to be transferred to network 52 at the correct time.

The underline logic (networks 72, 74, 76, 78 and 80) is disabled when there is no copy before the video head. Otherwise the all black condition would be interpreted as 64 underlines and consequently be stripped from the video scan data, leaving an all white condition which the OCR portion of system 48 would interpret as the presence of a page. Therefore, the underline logic is not enabled until 16 contiguous white bits are seen at the input. While disabled, the video output (WSR) is forced to an all black condition; the video buffer 72 is flushed with all white; the accumulators in buffer 76 are all preset to a zero value. Once enabled, the module 52 remains enabled until one of the accumulators indicates a maximum value for 16 contiguous bit positions, indicating a substantial block of all black video.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Method for detecting horizontal line characteristics in an image, said image including one or more lines of symbols defined by elemental areas (pixels) having a first optical characteristic against a background defined by pixels having a second optical characteristic, said lines extending in a first direction, wherein each of said symbols is representative of a text character, or a horizontal line character, or a text character and an associated horizontal line character below said text character, comprising the steps of:

scanning at least one of said lines of symbols in said first direction, and detecting the optical characteristics of the pixels in said scanned line and storing binary data representative of said detected characteristics, processing said stored optical characteristic data corresponding to a succession of rectangular swaths of said scanned line, each swath being one pixel wide in said first direction and extending a predetermined number of pixels beyond said scanned line in said second direction, said processing including the step of identifying the stored data representative of each pixel for each current swath which one of the following conditions is met:

A. the corresponding pixel in said current swath has said first optical characteristic, and the corresponding pixels in at least a predetermined number (X−1) of contiguous swaths have said first optical characteristic, B. the corresponding pixel in said current swath has said first optical characteristic, and the corresponding pixels in at least a predetermined number (Y−1) of contiguous swaths have said first optical characteristic, and said corresponding pixel is adjacent to a pixel in said current swath for which the corresponding stored data bit is representative of a horizontal line characteristic, where X and Y are integers and Y is less than X, and C. the corresponding pixel in said current swath has said first characteristic and corresponding stored data bit for the next previous swath in said succession is representative of a horizontal line characteristic, said identified data being representative of said horizontal line characteristics.

2. The method according to claim 1 wherein said processing for each current swath comprises the further step of:

identifying said stored data representative of each pixel having said first optical characteristic, and being adjacent to and below n−1 contiguous pixels having said first optical characteristic and n pixels below a pixel in said current swath for which the corresponding stored data bit is identified as being representative of a horizontal line characteristic, and being adjacent to and above a pixel in said current swath having said second optical characteristic where n is an integer, said further identified data being representative of horizontal line characteristics.

3. The method according to claim 1 wherein said processing for each current swath comprises the further step of:

identifying said stored data representative of each pixel having said first optical characteristic, and being adjacent to and above n−1 contiguous pixels having said first optical characteristic and n pixels above a pixel in said current swath for which the corresponding stored data bit is identified as being representative of an horizontal line characteristic, and being adjacent to and below a predetermined number (2Z+1) of contiguous pixels having said second optical characteristic and extending in said first direction and centered about said current swath, where n is an integer, said further identified data being representative of horizontal line characteristics.

4. The method according to claim 3 wherein said processing for each current swath comprises the further step of:

identifying said stored data representative of each pixel having said first optical characteristic, and being adjacent to and below n−1 contiguous pixels having said first optical characteristic and n pixels below a pixel in said current swath for which the corresponding stored data bit is identified as being representative of a horizontal line characteristic, and being adjacent to and above a pixel in said current swath having said second optical characteristic, said further identified data being representative of horizontal line characteristics.

5. The method according to claim 1 wherein said processing for each current swath comprises the further step of:

identifying said stored data representative of each pixel having said first optical characteristic, and being adjacent to and below n−1 contiguous pixels having said first optical characteristic and n pixels below a pixel in said current swath for which the corresponding stored data bit is identified as being representative of a horizontal line characteristic, and being adjacent to and above a predetermined number (2Z+1) of contiguous pixels having said second optical characteristic and extending in said first direction and centered about said current swath, where n is an integer, said further identified data being representative of horizontal line characteristics.

6. The method according to claim 3 wherein said processing for each current swath comprises the further step of:

identifying said stored data representative of each pixel having said first optical characteristic, and being adjacent to and below n−1 contiguous pixels having said first optical characteristic and n pixels below a pixel in said current swath for which the corresponding stored data bit is identified as being representative of a horizontal line characteristic, and being adjacent to and above a predetermined number (2Z+1) of contiguous pixels having said second optical characteristic and extending in said first direction and centered about said current swath, where n is an integer, said further identified data being representative of horizontal line characteristics.

7. The method according to claim 1 wherein said identifying step includes the sub-steps of:

generating a binary current swath mask word (CSMW) for said current swath, said CSMW having a bit corresponding to each pixel in said current swath, wherein a bit in said CSMW has a first binary value when one of conditions A, B and C is satisfied, and a bit in said CSMW has a second binary value otherwise, and identifying said stored data representative of each pixel for which the corresponding CSMW bit has said first binary value, said identified data being representative of said horizontal line characteristics.

8. The method according to claim 3 wherein said processing for each current swath comprises the further step of:

identifying said stored data representative of each pixel having said first optical characteristic, and being adjacent to and above n−1 contiguous pixels having said first optical characteristic and n pixels above a pixel in said current swath for which the corresponding stored data bit is identified as being representative of a horizontal line characteristic, and being adjacent to and below a number (less than Z+1) of contiguous pixels having said second optical characteristic and extending on each side of said current swath in said first direction, wherein at least one of said contiguous pixels on each side of said current swath is adjacent to and above a pixel having said second optical characteristic, said further identified data being representative of horizontal line characteristics.

9. The method according to claims 5 or 6 wherein said processing for each current swath comprises the further step of:

identifying said stored data representative of each pixel having said first optical characteristic, and being adjacent to and below n−1 contiguous pixels having said first optical characteristic and n pixels below a pixel in said current swath for which the corresponding stored data bit is identified as being representative of a horizontal line characteristic, and being adjacent to and above a number (less than Z+1) of contiguous pixels having said second optical characteristic and extending on each side of said current swath in said first direction, wherein at least one of said contiguous pixels on each side of said current swath is adjacent to and below a pixel having said second optical characteristic, said further identified data being representative of horizontal line characteristics.

10. The method according to claims 2 or 3 or 4 or 5 or 6 or 7 wherein said processing includes the further step of generating a character data signal representative of said text characters, said character data signal including one bit for each of said pixels, said bits having the same binary value as the bits in said stored data representative of pixels having said second optical characteristic for said identified bits of said stored data, and having the same binary values as the corresponding bits in said stored data for non-identified bits of said stored data.

11. The method according to claims 2 or 3 or 4 or 5 or 6 wherein n equals 1.

12. The method according to claims 2 or 3 or 4 or 5 or 6 wherein n is greater than 1, and including the step of additionally identifying said stored data representative of said pixels between said each pixel and said $n^{th}$ pixel, said additionally identified data being representative of horizontal line characteristics.

13. Method for processing a succession of bits of digitized scan data, said bits being representative of an optical characteristic of a corresponding succession of elemental areas (pixels) of a vertically scanned image including at least one horizontal line of symbols defined by pixels having said optical characteristic in a first range against a background defined by pixels having said optical characteristic in a second range, said bits having a first binary value for symbol pixels and a second binary value for background pixels, wherein each of said symbols is representative of a text character, or a horizontal line character, or a text character and an associated horizontal line character below said text character, comprising the steps of:

detecting bits in said scan data succession representative of substantially horizontal line segments in said image, processing said detected bits to identify horizontal line segments which underlie said line of symbols, and to generate underline signals representative of said identified horizontal line segments, generating a succession of character data bits related to said succession of scan data bits, wherein the character data bits corresponding to said detected scan data bits have said second binary value and the other character bits have the same binary value as the corresponding bits in said scan data succession, processing said character data to identify and generate character signals representative of said text characters represented by said scan data, associating said underline signals with the corresponding character signals.

14. The method according to claim 13 wherein said detecting step comprises the steps of:

processing the bits of said scan data representative of a succession of vertical swaths of said line of symbols, said swath being one pixel wide and extending a plurality of pixels above and below said line of symbols, and identifying the scan data representative of each pixel for each current swath which one of the following condition is met:

A. the corresponding pixel in said current swath has said first optical characteristic, and the corresponding pixels in at least a predetermined number $(X-1)$ of contiguously succeeding swaths have said first optical characteristic, B. the corresponding pixel in said current swath has said first optical characteristic, and the corresponding pixels in at least a predetermined number $(Y-1)$ of contiguously succeeding swaths have said first optical characteristic, and said corresponding pixel is adjacent to a pixel in said current swath for which the corresponding stored data bit is representative of a horizontal line segment where X and Y are integers and Y is less than X, and C. the corresponding pixel in said current swath has said first characteristic and corresponding stored data bit for the next previous swath in said succession is representative of a horizontal line segment, said identified data being representative of horizontal line segments.

15. The method according to claim 14 wherein said detecting for each current swath comprises the further step of:

identifying said scan data representative of each pixel having said first optical characteristic, and being adjacent to and below $n-1$ contiguous pixels having said first optical characteristic and n pixels below a pixel in said current swath for which the corresponding stored data bit is identified as being representative of a horizontal line segment, and being adjacent to and above a pixel in said current swath having said second optical characteristic, where n is an integer, said further identified data being representative of horizontal line segments.

16. The method according to claim 14 wherein said detecting for each current swath comprises the further step of:

identifying said scan data representative of each pixel having said first optical characteristic, and being adjacent to and above $n-1$ contiguous pixels having said first optical characteristic and n pixels above a pixel in said current swath for which the corresponding stored data bit is identified as being representative of a horizontal line segment, and being adjacent to and below a predetermined number $(2Z+1)$ of contiguous pixels having said second optical characteristic and extending in said first direction and centered about said current swath, where n is an integer, said further identified data being representative of horizontal line segments.

17. The method according to claim 16 wherein said detecting for each current swath comprises the further step of:

identifying said scan data representative of each pixel having said first optical characteristic, and being adjacent to and below $n-1$ contiguous pixels having said first optical characteristic and n pixels below a pixel in said current swath for which the corresponding stored data bit is identified as being representative of horizontal line segments, and being adjacent to and above a pixel in said current swath having said second optical characteristic, said further identified data being representative of horizontal line segments.

18. The method according to claim 14 wherein said detecting for each current swath comprises the further step of:

identifying said scan data representative of each pixel having said first optical characteristic, and being adjacent to and below $n-1$ contiguous pixels having said first optical characteristic and n pixels below a pixel in said current swath for which the corresponding stored data bit is identified as being representative of a horizontal line segment, and being adjacent to and above a predetermined number $(2Z+1)$ of contiguous pixels having said second optical characteristic and extending in said first direction and centered about said current swath, where n is an integer, said further identified data being representative of horizontal line segments.

19. The method according to claim 16 wherein said detecting for each current swath comprises the further step of:

identifying said scan data representative of each pixel having said first optical characteristic, and being adjacent to and below $n-1$ contiguous pixels having said first optical characteristic and n pixels below a pixel in said current swath for which the corresponding stored data bit is identified as being representative of a horizontal line segment, and being adjacent to and above a predetermined number $(2Z+1)$ of contiguous pixels having said second optical characteristic and extending in said first direction and centered about said current swath, where n is an integer, said further identified data being representative of horizontal line segments.

20. The method according to claim 14 wherein said identifying step includes the sub-steps of generating a binary current swath mask word (CSMW) for said current swath, said CSMW having a bit corresponding to each pixel in said current swath, wherein a bit in said CSMW has a first binary value when one of conditions A, B, and C is satisfied, and a bit in said CSMW has a second binary value otherwise, identifying said stored data representative of each pixel for which the corresponding CSMW bit has said first binary value, said identified data being representative of said horizontal line segments.

21. The method according to claim 16 wherein said detecting for each current swath comprises the further step of:

identifying said scan data representative of each pixel having said first optical characteristic, and being adjacent to and above n−1 contiguous pixels having said first optical characteristic and n pixels above a pixel in said current swath for which the corresponding stored data bit is identified as being representative of a horizontal line segment, and being adjacent to and below a number (less than Z+1) of contiguous pixels having said second optical characteristic and extending on each side of said current swath in said first direction, wherein at least one of said contiguous pixels on each side of said current swath is adjacent to and above a pixel having said second optical characteristic, said further identified data being representative of horizontal line segments.

22. The method according to claims 18 or 19 wherein said detecting for each current swath comprises the further step of:

identifying said scan data representative of each pixel having said first optical characteristic, and being adjacent to and below n−1 contiguous pixels having said first optical characteristic and n pixels below a pixel in said current swath for which the corresponding stored data bit is identified as being representative of a horizontal line segment, and being adjacent to and above a number (less than Z+1) of contiguous pixels having said second optical characteristic and extending on each side of said current swath in said first direction, wherein at least one of said contiguous pixels on each side of said current swath is adjacent to and below a pixel having said second optical characteristic, said further identified data being representative of horizontal line segments.

23. The method according to claims 15 or 16 or 17 or 18 or 19 wherein n equals 1.

24. The method according to claims 15 or 16 or 17 or 18 or 19 wherein n is greater than 1, and including the step of additionally identifying said stored data representative of said pixels between said each pixel and said nth pixel, said additionally identified data being representative of horizontal line segments.

25. System for detecting horizontal line characteristics in an image, said image including one of more lines of symbols defined by elemental areas (pixels) having a first optical characteristic against a background defined by pixels having a second optical characteristic, said lines extending in a first direction, wherein each of said symbols is representative of a text character, or a horizontal line character, or a text character and an associated horizontal line character below said text character, comprising:

means for scanning at least one of said lines of symbols in said first direction, and means for detecting the optical characteristics of the pixels in said scanned line and storing binary data representative of said detected characteristics, means for processing said stored optical characteristic data corresponding to a succession of rectangular swaths of said scanned line, each swath being one pixel wide in said first direction and extending a predetermined number of pixels beyond said scanned line in said second direction, said processing means including means for identifying the stored data representative of each pixel for each current swath which one o the following characteristics is met:

A. the corresponding pixel in said current swath has said first optical characteristic, and the corresponding pixels in at least a predetermined number (X−1) of contiguous swaths have said first optical characteristic, B. the corresponding pixel in said current swath has said first optical characteristic, and the corresponding pixels in at least a predetermined number (Y−1) of contiguous swaths have said first optical characteristic, and said corresponding pixel is adjacent to a pixel in said current swath for which the corresponding stored data bit is representative of a horizontal line characteristic, where X and Y are integers and Y is less than X, and C. the corresponding pixel in said current swath has said first characteristic and corresponding stored data bit for the next previous swath in said succession is representative of a horizontal line characteristic, said identified data being representative of said horizontal line characteristics.

26. The system according to claim 25 wherein said processing means further comprises:

means operative for each current swath for identifying said stored data representative of each pixel having said first optical characteristic, and being adjacent to and below n−1 contiguous pixels having said first optical characteristic and n pixels below a pixel in said current swath for which the corresponding stored data bit is identified as being representative of a horizontal line characteristic, and being adjacent to and above a pixel in said current swath having said second optical characteristic where n is an integer, said further identified data being representative of horizontal line characteristics.

27. The system according to claim 25 wherein said processing means further comprises:

means operative for each current swath for identifying said stored data representative of each pixel having said first optical characteristic, and being adjacent to and above n−1 contiguous pixels having said first optical characteristic and n pixels above a pixel in said current swath for which the corresponding stored data bit is identified as being representative of a horizontal line characteristic, and being adjacent to and below a predetermined number (2Z+1) of contiguous pixels having said second optical characteristic and extending in said first direction and centered about said current swath, where n is an integer, said further identified data being representative of horizontal line characteristics.

28. The system according to claim 27 wherein said processing means further comprises:

means operative for each current swath for identifying said stored data representative of each pixel having said first optical characteristic, and being adjacent to and below n−1 contiguous pixels having said first optical characteristic and n pixels below a pixel in said current swath for which the corresponding stored data bit is identified as being representative of a horizontal line underline characteristic, and being adjacent to and above a pixel in said current swath having said second optical characteristic, said further identified data being representative of horizontal line characteristics.

29. The system according to claim 25 wherein said processing means further comprises:

means operative for each current swath for identifying said stored data representative of each pixel having said first optical characteristic, and being adjacent to and below n−1 contiguous pixels having said first optical characteristic and n pixels below a pixel in said current swath for which the corresponding stored data bit is identified as being representative of a horizontal line characteristic, and being adjacent to and above a predetermined number (2Z+1) of contiguous pixels having said second optical characteristic and extending in said first direction and centered about said current swath, where n is an integer, said further identified data being representative of horizontal line characteristics.

30. The system according to claim 27 wherein said processing means further comprises:

means operative for each current swath for identifying said stored data representative of each pixel having said first optical characteristic, and being adjacent to and below n−1 contiguous pixels having said first optical characteristic and n pixels below a pixel in said current swath for which the corresponding stored data bit is identified as being representative of a horizontal line characteristic, and being adjacent to and above a predetermined number (2Z+1) of contiguous pixels having said second optical characteristic and extending in said first direction and centered about said current swath, where n is an integer, said further identified data being representative of horizontal line characteristics.

31. The system according to claim 25 wherein said identifying means includes:

means for generating a binary current swath mask word (CSMW) for said current swath, said CSMW having a bit corresponding to each pixel in said current swath, wherein a bit in said CSMW has a first binary value when one of conditions A, B and C is satisfied, and a bit in said CSMW has a second binary value otherwise, and means for identifying said stored data representative of each pixel for which the corresponding CSMW bit has said first binary value, said identified data being representative of said horizontal line characteristics.

32. The system according to claim 27 wherein said processing means further comprises:

means operative for each current swath for identifying said stored data representative of each pixel having said first optical characteristic, and being adjacent to and above n−1 contiguous pixels having said first optical characteristic and n pixels above a pixel in said current swath for which the corresponding stored data bit is identified as being representative of a horizontal line characteristic, and being adjacent to and below a number (less than Z+1) of contiguous pixels having said second optical characteristic and extending on each side of said current swath in said first direction, wherein at least one of said contiguous pixels on each side of said current swath is adjacent to and above a pixel having said second optical characteristic, said further identified data being representative of horizontal line characteristics.

33. The system according to claims 29 or 30 wherein said processing means further comprises:

means operative for each current swath for identifying said stored data representative of each pixel having said first optical characteristic, and being adjacent to and below n−1 contiguous pixels having said first optical characteristic and n pixels below a pixel in said current swath for which the corresponding stored data bit is identified as being representative of a horizontal line characteristic, and being adjacent to and above a number (less than Z+1) of contiguous pixels having said second optical characteristic and extending on each side of said current swath in said first direction, wherein at least one of said contiguous pixels on each side of said current swath is adjacent to and below a pixel having said second optical characteristic, said further identified data being representative of horizontal line characteristics.

34. The system according to claims 26 or 27 or 28 or 29 or 30 or 31 wherein said processing means further includes means for generating a character data signal representative of said text characters, said character data signal including one bit for each of said pixels, said bits having the same binary value as the bits in said stored data representative of pixels having said second optical characteristic for said identified bits of said stored data, and having the same binary values as the corresponding bits in said stored data for non-identified bits of said stored data.

35. The system according to claims 26 or 27 or 28 or 29 or 30 wherein n equals 1.

36. The system according to claims 26 or 27 or 28 or 29 or 30 wherein n is greater than 1, and including the step of additionally identifying said stored data representative of said pixels between said each pixel and said $n^{th}$ pixel, said additionally identified data being representative of horizontalb line characteristics.

37. System for processing a succession of bits of digitized scan data, said bits being representative of an optical characteristic of a corresponding succession of elemental areas (pixels) of a vertically scanned image including at least one horizontal line of symbols defined by pixels having said optical characteristic in a first range against a background defined by pixels having said optical characteristic in a second range, said bits having a first binary value for symbol pixels and a second binary value for background pixels, wherein each of said symbols is representative of a text character, or a horizontal line character, or a text character and an associated horizontal character below said text character, comprising:

means for detecting bits in said scan data succession representative of substantially horizontal line segments in said image, means for processing said detected bits to identify horizontal line segments which underlie said line of symbols, and for generating underline signals representative of said identified horizontal line segments, means for generating a succession of character data bits related to said succession of scan data bits, wherein the character data bits corresponding to said detected scan data bits have said second binary value and the other character bits have the same binary value as the corresponding bits in said scan data succession, means for processing said character data to identify and generate character signals representative of said text characters represented by said scan data, means for associating said underline signals with the corresponding character signals.

38. The system according to claim 37 wherein said detecting means comprises:

means for processing the bits of said scan data representative of a succession of vertical swaths of said line of symbols, said swath being one pixel wide and extending a plurality of pixels above and below said line of symbols, and means for identifying the scan data representative of each pixel for each current swath which one of the following conditions is met:

A. the corresponding pixel in said current swath has said first optical characteristic, and the corresponding pixels in at least a predetermined number (X−1) of contiguously succeeding swaths have said first optical characteristic, B. the corresponding pixel in said current swath has said first optical characteristic, and the corresponding pixels in at least a predetermined number (Y−1) of contiguously succeeding swaths have said first optical characteristic, and said corresponding pixel is adjacent to a pixel in said current swath for which the corresponding stored data bit is representative of a horizontal line segment where X and Y are integers and Y is less than X, and C. the corresponding pixel in said current swath has said first characteristic and corresponding stored data bit for the next previous swath in said succession is representative of a horizontal line segment, said identified data being representative of said horizontal line segments.

39. The method according to claim 38 wherein said detecting means further comprises:

means operative for each current swath for identifying said scan data representative of each pixel having said first optical characteristic, and being adjacent to and below n−1 contiguous pixels having said first optical characteristic and n pixels below a pixel in said current swath for which the corresponding stored data bit is identified as being representative of a horizontal line segment, and being adjacent to and above a pixel in said current swath having said second optical characteristic, where n is an integer, said further identified data being representative of horizontal line segments.

40. The system according to claim 38 wherein said detecting means further comprises:

means operative for each current swath for identifying said scan data representative of each pixel having said first optical characteristic, and being adjacent to and above n−1 contiguous pixels having said first optical characteristic and n pixels above a pixel in said current swath for which the corresponding stored data bit is identified as being representative of a horizontal line segment, and being adjacent to and below a predetermined number (2Z+1) of contiguous pixels having said second optical characteristic and extending in said first direction and centered about said current swath, where n is an integer, said further identified data being representative of horizontal line segments.

41. The system according to claim 40 wherein said detecting means further comprises:

means operative for each current swath for identifying said scan data representative of each pixel having said first optical characteristic, and being adjacent to and below n−1 contiguous pixels having said first optical characteristic and n pixels below a pixel in said current swath for which the corresponding stored data bit is identified as being representative of a horizontal line segment, and being adjacent to and above a pixel in said current swath having said second optical characteristic, said further identified data being representative of horizontal line segments.

42. The system according to claim 38 wherein said detecting means further comprises:

means operative for each current swath for identifying said scan data representative of each pixel having said first optical characteristic, and being adjacent to and below n−1 contiguous pixels having said first optical characteristic and n pixels below a pixel in said current swath for which the corresponding stored data bit is identified as being representative of a horizontal line segment, and being adjacent to and above a predetermined number (2Z+1) of contiguous pixels having said second optical characteristic and extending in said first direction and centered about said current swath, where n is an integer, said further identified data being representative of horizontal line segments.

43. The system according to claim 40 wherein said detecting means further comprises:

means operative for each current swath for identifying said scan data representative of each pixel having said first optical characteristic, and being adjacent to and below n−1 contiguous pixels having said first optical characteristic and n pixels below a pixel in said current swath for which the corresponding stored data bit is identified as being representative of a horizontal line segment, and being adjacent to and above a predetermined number (2Z+1) of contiguous pixels having said second optical characteristic and extending in said first direction and centered about said current swath, where n is an integer, said further identified data being representative of horizontal line segments.

44. The system according to claim 38 wherein said identifying means includes means for generating a binary current swath mask word (CSMW) for said current swath, said CSMW having a bit corresponding to each pixel in said current swath, wherein a bit in said CSMW has a first binary value when one of conditions A, B, and C is satisfied, and a bit in said CSMW has a second binary value otherwise, and means for identifying said stored data representative of each pixel for which the corresponding CSMW bit has said first binary value, said identified data being representative of said horizontal line segments.

45. The system according to claim 40 wherein said detecting means further comprises:

means operative for each current swath for identifying said scan data representative of each pixel having said first optical characteristic, and being adjacent to and above n−1 contiguous pixels having said first optical characteristic and n pixels above a pixel in said current swath for which the corresponding stored data bit is identified as being representative of a horizontal line segment, and being adjacent to and below a number (less than Z+1) of contiguous pixels having said second optical characteristic and extending on each side of said current swath in said first direction, wherein at least one of said contiguous pixels on each side of said current swath is adjacent to and above a pixel having said second optical characteristic, said further identified data being representative of horizontal line segments.

46. The system according to claims 42 or 43 wherein said detecting means further comprises:

means operative for each current swath for identifying said scan data representative of each pixel having said first optical characteristic, and being adjacent to and below n−1 contiguous pixels having said first optical characteristic and n pixels below a pixel in said current swath for which the corresponding stored data bit is identified as being representative of a horizontal line segment, and being adjacent to and above a number (less than Z+1) of contiguous pixels having said second optical characteristic and extending on each side of said current swath in said first direction, wherein at least one of said contiguous pixels on each side of said current swath is adjacent to and below a pixel having said second optical characteristic, said further identified data being representative of horizontal line segments.

47. The system according to claims 39 or 40 or 41 or 42 or 43 wherein n equals 1.

48. The system according to claims 39 or 40 or 41 or 42 or 43 wherein n is greater than 1, and including the step of additionally identifying said stored data representative of said pixels between said each pixel and said $n^{th}$ pixel, said additionally identified data being representative of horizontal line segments.

49. The method according to claim 3 wherein said processing for each current swath comprises the further step of:

identifying said stored data representative of each pixel having said first optical characteristic, and being adjacent to and above n−1 contiguous pixels having said first optical characteristic and n pixels above a pixel in said current swath for which the corresponding stored data bit is identified as being representative of a horizontal line characteristic, and being adjacent to and below a number (less than Z+1) of contiguous pixels having said second optical characteristic and extending on one side of said current swath in said first direction, wherein at least one of said contiguous pixels is adjacent to and above a pixel having said second optical characteristic, and being adjacent to and below a predetermined number (Z+1) of contiguous pixels having said second optical characteristic and on the other side of said current swath in said first direction, said further identified data being representative of horizontal line characteristics.

50. The method according to claims 5 or 6 wherein said processing for each current swath comprises the further step of:

identifying said stored data representative of each pixel having said first optical characteristic, and being adjacent to and below n−1 contiguous pixels having said first optical characteristic and n pixels below a pixel in said current swath for which the corresponding stored data bit is identified as being representative of a horizontal line characteristic, and being adjacent to and above a number (less than Z+1) of contiguous pixels having said second optical characteristic and extending on one side of said current swath in said first direction, wherein at least one of said contiguous pixels is adjacent to and below a pixel having said second optical characteristic, and being adjacent to and above a predetermined number (Z+1) of contiguous pixels having said second optical characteristic and on the other side of said current swath in said first direction, said further identified data being representative of horizontal line characteristics.

51. The method according to claim 16 wherein said detecting for each current swath comprises the further step of:

identifying said scan data representative of each pixel having said first optical characteristic, and being adjacent to and above n−1 contiguous pixels having said first optical characteristic and n pixels above a pixel in said current swath for which the corresponding stored data bit is identified as being representative of a horizontal line segment, and being adjacent to and below a number (less than Z+1) of contiguous pixels having said second optical characteristic and extending on one side of said current swath in said first direction, wherein at least one of said contiguous pixels is adjacent to and above a pixel having said second optical characteristic, and being adjacent to and below a predetermined number (Z+1) of contiguous pixels having said second optical characteristic and on the other side of said current swath in said first direction, said further identified data being representative of horizontal line segments.

52. The method according to claims 18 or 19 wherein said detecting for each current swath comprises the further step of:

identifying said scan data representative of each pixel having said first optical characteristic, and being adjacent to and below n−1 contiguous pixels having said first optical characteristic and n pixels below a pixel in said current swath for which the corresponding stored data bit is identified as being representative of a horizontal line segment, and being adjacent to and above a number (less than Z+1) of contiguous pixels having said second optical characteristic and extending on one side of said current swath in said first direction, wherein at least one of said contiguous pixels is adjacent to and below a pixel having said second optical characteristic, and being adjacent to and above a predetermined number (Z+1) of contiguous pixels having said second optical characteristic and on the other side of said current swath in said first direction, said further identified data being representative of horizontal line segments.

53. The system according to claim 27 wherein said processing means further comprises:
   means operative for each current swath for identifying said stored data representative of each pixel having said first optical characteristic, and being adjacent to and above n−1 contiguous pixels having said first optical characteristic and n pixels above a pixel in said current swath for which the corresponding stored data bit is identified as being representative of a horizontal line characteristic, and being adjacent to and below a number (less than Z+1) of contiguous pixels having said second optical characteristic and extending on one side of said current swath in said first direction, wherein at least one of said contiguous pixels is adjacent to and above a pixel having said second optical characteristic, and being adjacent to and below a predetermined number (Z+1) of contiguous pixels having said second optical characteristic and on the other side of said current swath in said first direction, said further identified data being representative of horizontal line characteristics.

54. The system according to claims 29 or 30 wherein said processing means further comprises:
   means operative for each current swath for identifying said stored data representative of each pixel having said first optical characteristic, and being adjacent to and below n−1 contiguous pixels having said first optical characteristic and n pixels below a pixel in said current swath for which the corresponding stored data bit is identified as being representative of a horizontal line characteristic, and being adjacent to and above a number (less than Z+1) of contiguous pixels having said second optical characteristic and extending on one side of said current swath in said first direction, wherein at least one of said contiguous pixels is adjacent to and below a pixel having said second optical characteristic, and being adjacent to and above a predetermined number (Z+1) of contiguous pixels having said second optical characteristic and on the other side of said current swath in said first direction, said further identified data being representative of horizontal line characteristics.

55. The system according to claim 40 wherein said detecting means further comprises:
   means operative for each current swath for identifying said scan data representative of each pixel having said first optical characteristic, and being adjacent to and above n−1 contiguous pixels having said first optical characteristic and n pixels above a pixel in said current swath for which the corresponding stored data bit is identified as being representative of a horizontal line segment, and being adjacent to and below a number (less than Z+1) of contiguous pixels having said second optical characteristic and extending on one side of said current swath in said first direction, wherein at least one of said contiguous pixels is adjacent to and above a pixel having said second optical characteristic, and being adjacent to and below a predetermined number (Z+1) of contiguous pixels having said second optical characteristic and on the other side of said current swath in said first direction, said further identified data being representative of horizontal line segments.

56. The system according to claims 42 or 43 wherein said detecting means further comprises:
   means operative for each current swath for identifying said scan data representative of each pixel having said first optical characteristic, and being adjacent to and below n−1 contiguous pixels having said first optical characteristic and n pixels below a pixel in said current swath for which the corresponding stored data bit is identified as being representative of a horizontal line segment, and being adjacent to and above a number (less than Z+1) of contiguous pixels having said second optical characteristic and extending on one side of said current swath in said first direction, wherein at least one of said contiguous pixels is adjacent to and below a pixel having said second optical characteristic, and being adjacent to and above a predetermined number (Z+1) of contiguous pixels having said second optical characteristic and on the other side of said current swath in said first direction, said further identified data being representative of horizontal line segments.

* * * * *